(12) United States Patent
Mahani et al.

(10) Patent No.: US 11,221,804 B2
(45) Date of Patent: Jan. 11, 2022

(54) VISUAL TIMELINE AND OPERATOR PROMPT TO IMPROVE DATA COLLECTION FOR PRODUCTION PRINT SYSTEM

(71) Applicants: Maryamossadat Nematollahi Mahani, Boulder, CO (US); Vlad Alin Iordachescu, Mosnita veche (RO)

(72) Inventors: Maryamossadat Nematollahi Mahani, Boulder, CO (US); Vlad Alin Iordachescu, Mosnita veche (RO)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/837,253

(22) Filed: Apr. 1, 2020

(65) Prior Publication Data

US 2021/0311671 A1 Oct. 7, 2021

(51) Int. Cl.
*G06F 3/12* (2006.01)
*G06T 11/60* (2006.01)
(Continued)

(52) U.S. Cl.
CPC .......... *G06F 3/1204* (2013.01); *G06F 3/0482* (2013.01); *G06F 3/121* (2013.01);
(Continued)

(58) Field of Classification Search
CPC ...... G06F 3/1204; G06F 3/1256; G06F 3/121; G06F 3/0482; G06F 3/1259;
(Continued)

(56) References Cited

U.S. PATENT DOCUMENTS

| 6,512,591 B1 * | 1/2003 | Mesa | G06F 9/52 |
| | | | 358/1.15 |
| 8,185,463 B1 * | 5/2012 | Ball | G06Q 10/10 |
| | | | 705/36 R |

(Continued)

FOREIGN PATENT DOCUMENTS

| DE | 102015211199 A1 | 12/2016 |
| WO | 2019191082 A2 | 10/2019 |

OTHER PUBLICATIONS

System State replay Over Time; ip.com; An IP.com Prior Art Database; Apr. 11, 2011.

(Continued)

*Primary Examiner* — Juan M Guillermety
(74) *Attorney, Agent, or Firm* — Duft & Bornsen, PC (57) ABSTRACT

Systems and methods for visual timeline and operator prompt to improve data collection for a print system. One embodiment includes a printer terminal device configured to receive printer statuses of a printer over a period of time, each printer status indicating one of a printing state, an idle state, and an error state. The printer terminal device is configured to present a Graphical User Interface (GUI) at a display that includes a visual timeline of the printer statuses of the printer over the period of time with a different visual representation for each of the printing state, the idle state, and the error state. The printer terminal device is further configured to determine that a printer status displayed on the visual timeline is associated with absent user input, and to modify the visual timeline to display a visual indicator for the printer status indicating the absent user input.

20 Claims, 6 Drawing Sheets

(51) Int. Cl.
*G06F 3/0482* (2013.01)
*G06T 11/00* (2006.01)

(52) U.S. Cl.
CPC .......... *G06F 3/1256* (2013.01); *G06F 3/1259* (2013.01); *G06T 11/001* (2013.01); *G06T 11/60* (2013.01)

(58) Field of Classification Search
CPC .. G06F 11/3055; G06F 11/326; G06F 3/1229; G06T 11/001; G06T 11/60
See application file for complete search history.

(56) References Cited

U.S. PATENT DOCUMENTS

| | | | |
|---|---|---|---|
| 9,547,695 B2 | 1/2017 | Mahate et al. | |
| 9,552,842 B2* | 1/2017 | Parente | ............ H04N 21/47205 |
| 2011/0055065 A1* | 3/2011 | Brenner | ................. G06Q 40/00 |
| | | | 705/35 |
| 2015/0033139 A1 | 1/2015 | Thiel et al. | |
| 2015/0317104 A1* | 11/2015 | Takenouchi | .......... G06F 3/1222 |
| | | | 358/1.15 |
| 2017/0300272 A1 | 10/2017 | Kalloe et al. | |
| 2018/0232296 A1 | 8/2018 | Klein | |
| 2018/0307587 A1 | 10/2018 | Karmon et al. | |
| 2019/0007274 A1* | 1/2019 | Yoshida | .............. H04L 43/0876 |
| 2019/0034130 A1* | 1/2019 | Tajima | .................. G06F 3/1259 |
| 2020/0249886 A1* | 8/2020 | Yokoyama | ............ G06F 3/1259 |

OTHER PUBLICATIONS

European Search Report; Application EP21165934; dated Jul. 30, 2021.

* cited by examiner

VISUAL TIMELINE AND OPERATOR PROMPT TO IMPROVE DATA COLLECTION FOR PRODUCTION PRINT SYSTEM

FIELD

The disclosure relates to the field of printing, and in particular, to data collection for a production print system.

BACKGROUND

Production printers, which can print hundreds of pages per minute, are typically managed by a print operator that performs many tasks to make sure print jobs are printed correctly and efficiently. In addition to their other duties, print operators may be tasked with recording details about various states of a printer to help a print shop assess productivity. However, in an effort to finish their other primary tasks, print operators often write up logs of what happened at the end of the day, and the information may thus be prone to errors and approximations.

SUMMARY

Embodiments described herein provide for visual timeline and operator prompt to improve data collection for a print system. A printer terminal device in communication with a plurality of printers is configured to display, for each printer, a visual timeline of printer events. The visual timeline is augmented to indicate whether each event is associated with complete information or instead has missing information. For example, the visual timeline may visually show the operator that the operator has not yet attached commentary to describe a cause of the printer idling for a period of time. The visual display of the status of data entry for individual events conveniently prompts the print operator to complete/update event data while it is fresh in their memory instead of using written logs at the end of the day, thereby improving accuracy in data collection for the print shop to help print operators identify and correct inefficiencies in printing operations.

One embodiment is a system that includes a printer terminal device in communication with a printer and configured to receive printer statuses of the printer over a period of time. Each printer status indicates one of a printing state, an idle state, and an error state. The printer terminal device is configured to present a Graphical User Interface (GUI) at a display that includes a visual timeline of the printer statuses of the printer over the period of time. The visual timeline includes a different visual representation for each of the printing state, the idle state, and the error state. The printer terminal device is further configured to determine that a printer status displayed on the visual timeline is associated with absent user input, and to modify the visual timeline to display a visual indicator for the printer status indicating the absent user input.

Another embodiment is a method. The method includes receiving printer statuses of a printer over a period of time, each printer status indicating one of a printing state, an idle state, and an error state. The method also includes presenting a Graphical User Interface (GUI) at a display that includes a visual timeline of the printer statuses of the printer over the period of time, the visual timeline including a different visual representation for each of the printing state, the idle state, and the error state. The method further includes determining that a printer status displayed on the visual timeline is associated with absent user input, and modifying the visual timeline to display a visual indicator for the printer status indicating the absent user input.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific example embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
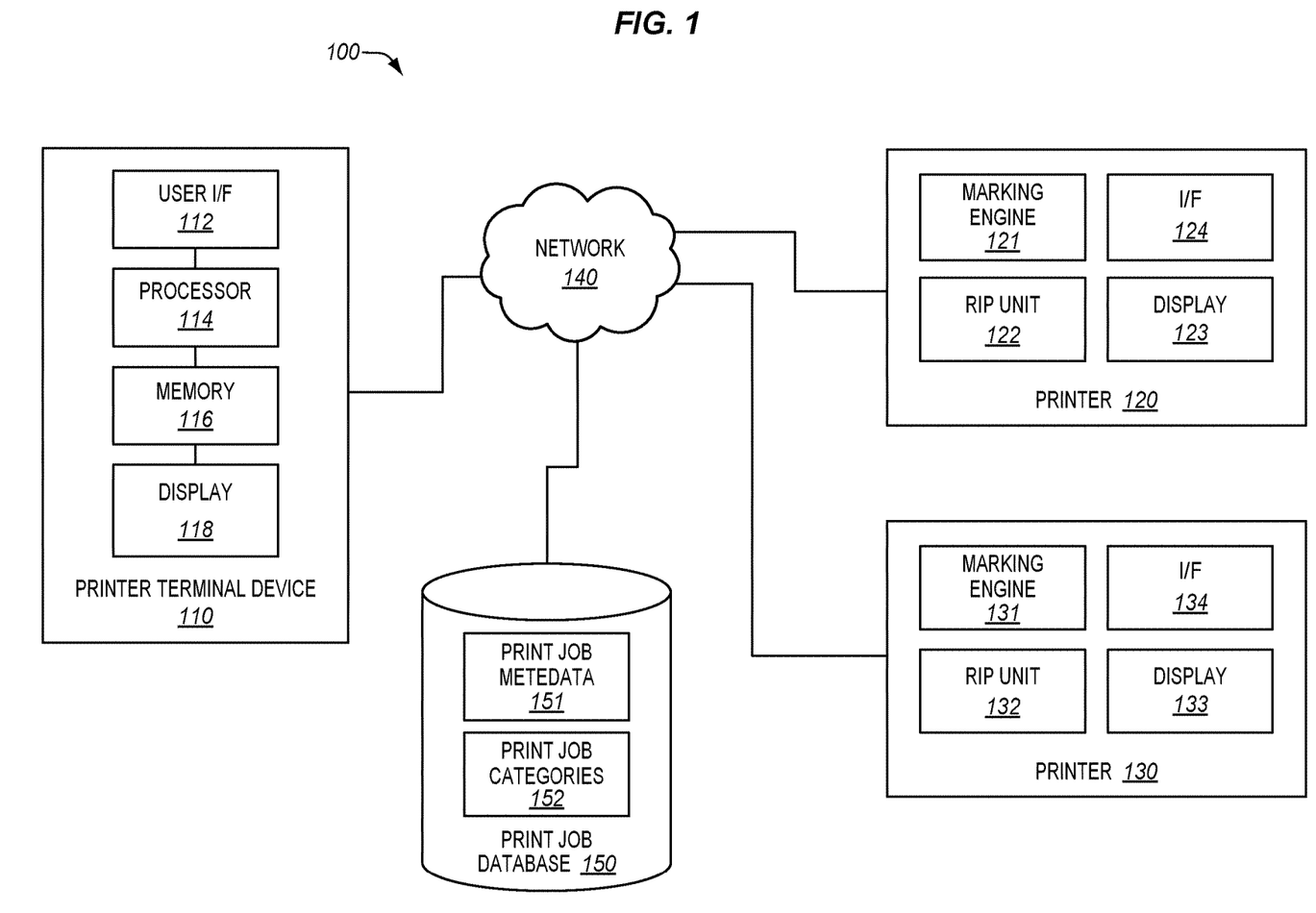
FIG. 1 is a block diagram of a print system in an illustrative embodiment.

FIG. 1 is a block diagram of a print system 100 in an illustrative embodiment. The print system 100 comprises any systems, devices, or components operable to print incoming print jobs. The print system 100 may be managed and monitored by a user, or print operator, interacting with a printer terminal device 110 in communication with printers 120 and 130 via a network 140. Generally, the printer terminal device 110 includes a display 118 to present one or more Graphical User Interfaces (GUIs) to the user, and utilizes user interface (I/F) 112 to receive user input pertaining to presented GUIs. For example, in some embodiments, the printer terminal device 110 comprises a tablet or similar device in which the display 118 and user I/F 112 are integrated in the form of a touch screen that the user may directly interact with. Alternatively or additionally, the user I/F 112 may comprise a keyboard, mouse, etc. for interacting with controls presented on such GUIs.

The printer terminal device 110 is enhanced to improve the accuracy of printer event data reported by a print operator by displaying a visual timeline of each printer's status that indicates whether any particular status has incomplete information for the operator to complete. For example, the visual timeline may show a period of time that the printer was idling, and further illustrate whether the operator has attached metadata to the idle event that includes additional detail describing the idle period. The visual timeline seamlessly prompts the print operator to enter printer status metadata throughout the normal course of their print management duties instead of at the end of the day. This facilitates an increase in the amount of printer status data that is reported as well as an increase in accuracy of that data. Advantageously, print shops may use this improved data to help identify effective solutions for mitigating the expense of printer idling times.

Generally, the printer terminal device 110 manages user interactions to facilitate the handling of print jobs to be printed with the printers 120/130. The network 140 carries communications between the printer terminal device 110 and printers 120 and 130 based on user interactions with GUIs presented via display 118. The network 140 comprises any combination of devices and components for routing communications between the printer terminal device 110, print job database 150, and printers 120 and 130. For example, the network 140 may comprise the Internet, a local intranet, etc.

The printer terminal device 110 also communicates with a print job database 150 via the network 140. The print job database 150 stores data of previous print jobs that have been printed by the print system 100. In particular, the print job database 150 may store print job metadata 151, and the print job metadata 151 may be correlated with print job categories 152 to group previous print jobs by various combinations of shared characteristics. As will be described in greater detail below, the printer terminal device 110 is enhanced to improve accuracy of the print job metadata 151 reported by the print operator, and further to use the print job categories 152 to generate useful prompts to the print operator via the display 118.

The printers 120 and 130 physically mark print media based on received print jobs. While only two printers are illustrated, in further embodiments any suitable number of printers may be managed by the printer terminal device 110. In this embodiment, printer 120 includes I/F 124 for exchanging data via the network 140. In response to receiving print data from the network 140, the printer 120 may engage in rasterization of the print data via Rasterization Image Processing (RIP) unit 122, which may include multiple Rasterization Image Processors. The rasterized print data may then be used to direct the operations of a marking engine 121 (e.g., an inkjet marking engine, laser print engine, etc.) in order to mark physical media. The printer 120 may also include a display 123. In some embodiments, functions and/or GUIs described with respect to the display 118 of the printer terminal device 110 may alternatively or additionally be implemented with the display 123 of the printer 120. The printer 130 includes similar elements to those of printer 120, such as marking engine 131, RIP unit 132, display 133, and I/F 134.

In one embodiment, the printer terminal device includes a processor 114 and memory 116. The processor 114 is operable to perform the functions of the printer terminal device 110, and may be implemented as custom circuitry, as a hardware processor executing programmed instructions stored in memory 116, etc. Memory 116 may also store instructions for one or more GUIs to users of the printer terminal device 110. Memory 116 may be implemented as a solid-state memory, spinning disk, etc. in order to electronically store data.

The printer terminal device 110, print job database 150, and printers 120/130 may include an Ethernet interface, Wi-Fi interface, etc. for engaging in communications with network 140. Although the printer terminal device 110 and print job database 150 are shown and described as separate, remote components, it will be appreciated that, in some embodiments, the print system 100 may implement cloud functionality in which processing/storage functions of the printer terminal device 110 and print job database 150 may be at least partially implemented in the other, or implemented remotely via other component(s) or sever(s) connected to the network 140. The particular arrangement, number, and configuration of components described herein are examples for purposes of discussion and are non-limiting.

Figure 2:
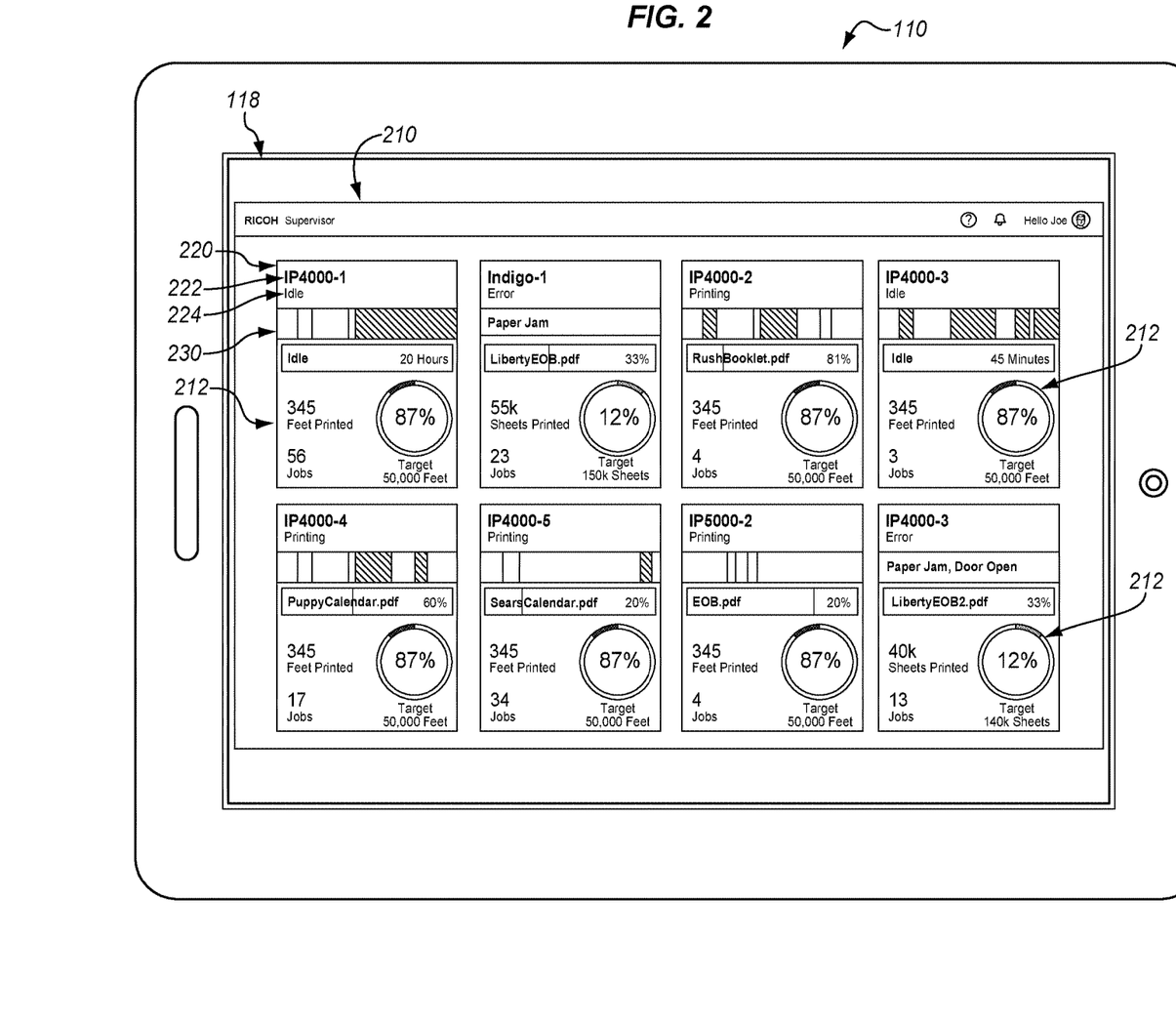
FIG. 2 shows a printer terminal device in an illustrative embodiment.

FIG. 2 shows a printer terminal device 110 in an illustrative embodiment. The printer terminal device 110 includes the display 118 to present one or more GUI(s) 210 displaying information of the print system 100. In particular, the GUI 210 includes a plurality of graphic windows 212 that each display data for a printer of the print system 100. Each graphic window 212 includes a printer status window 220 and a visual timeline 230. The printer status window 220 includes a printer identifier 222 that identifies the printer, and a current status indicator 224 indicating a current status of the printer. The visual timeline 230 displays a history of statuses of the printer.

Figure 3:
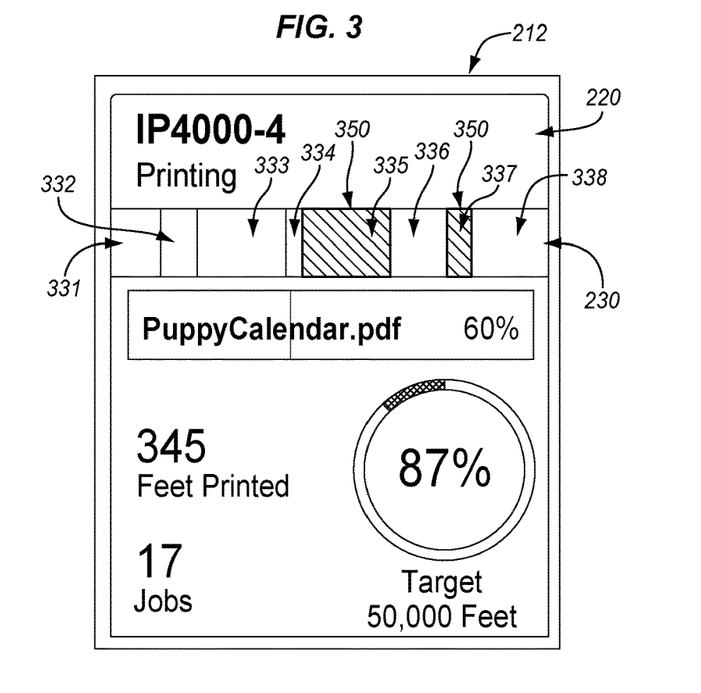
FIG. 3 shows a graphic window displaying the visual timeline in an illustrative embodiment.

FIG. 3 shows a graphic window 212 displaying the visual timeline 230 in an illustrative embodiment. The visual timeline 230 includes a series of printer statuses 331-338 that adjoin along a single dimension to represent the status history of a printer over a period of time. A width of each printer status 331-338 within the visual timeline 230 and/or graphic window 212 may be proportional to an amount of time for which that printer status occurred.

The visual timeline 230 displays the printer statuses 331-338 in a manner that visually distinguishes changes to the type of printer status over time. For example, types of printer status may include printing states, idle states, and/or an error states. And, the visual timeline 230 may include a different visual representation for each of the printing state, the idle state, and the error state. For instance, in embodiments in which the different visual representation includes different colors, periods of normal printing may comprise green blocks/backgrounds, periods of idle times may comprise grey blocks/backgrounds, and periods of error states may comprise red blocks/backgrounds in the visual timeline 230. Similarly, the current status indicator 224 of the printer status window 220 may comprise a color indication of the printer's current status. For example, a background color of the printer status window 220 may be green to indicate printing, grey to indicate idle, and/or red to indicate error.

Additionally, the visual timeline 230 displays whether each printer status 331-338 is associated with complete or incomplete information. For example, printer statuses 331-338 having complete metadata may be displayed with a solid color/background, and printer statuses 331-338 having incomplete metadata may be displayed with a visual indicator 350. In this example, printer statuses 335 and 337 are associated with missing metadata, and the visual timeline 230 displays a visual indicator 350 indicating a prompt for user input.

As shown in the example of FIG. 3, the visual indicator 350 may comprise a visual overlay on the printer status in the visual timeline 230. As additionally shown in this example, the visual overlay may comprise hash marks. For instance, the visual indicator 350 of printer status 335 may comprise markings over a grey background to indicate missing metadata for an idling event, and the visual indicator 350 of printer status 337 may comprise markings over a red background to indicate missing metadata for an error event. However, it will be appreciated that the visual indicator 350 may additionally or alternatively include other visual symbols and graphics such as arrows, asterisks, blank fields, pop-up windows, etc.

In some embodiments, the visual indicator 350 includes a control element that is responsive to user selection. For example, areas of printer statuses 331-338 on the visual timeline 230 which include or are associated with the visual indicator 350 may be selectable via user touch or pointer device clicks. In response to user selection of the visual indicator 350, additional user input prompts may be generated and displayed as further described below.

Figure 4:
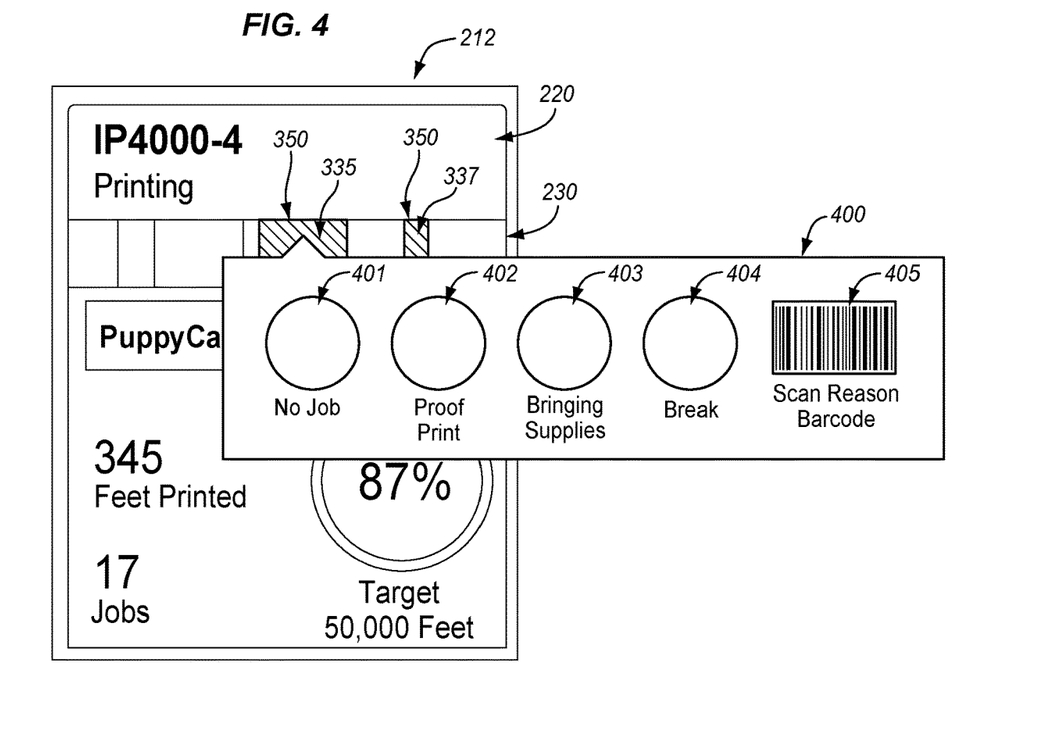
FIG. 4 shows a graphic window displaying a prompt for user input in relation to the visual timeline in an illustrative embodiment.

FIG. 4 shows a graphic window 212 displaying a prompt 400 for user input in relation to the visual timeline 230 in an illustrative embodiment. Suppose, for this example, that the print operator has selected the visual indicator 350 of the printer status 335 having a grey background to indicate an idle period. In response, the printer terminal device 110 generates/displays the prompt 400 on the GUI 210. The prompt 400 may include a graphical window with potential reasons for the printer status as selectable options 401-405. For example, the operator may select the area of selectable option 403 to indicate that the idle period, or printer status 335, was due to fetching supplies for the printer. Using patterns of this type of information collected over time, a print shop may make informed decisions to improve print shop efficiency such as determining to relocate their supplies closer to the print area based on the number of user responses indicating fetching supplies as a factor for printer idling periods.

After the print operator has selected one of the selectable options 401-405, the prompt 400 may be removed and the visual timeline 230 may be modified to remove display of the visual indicator 350. For example, the area of printer status 335 may turn solid grey to indicate that the period of idling is associated with complete metadata. The visual timeline 230 thus unobtrusively cues the print operator to fill in details for printer events at the print system 100 without interrupting their operator duties and interactions with the printer terminal device 110 and GUI 210 to manage the print system 100.

The selectable options 401-405 may alternatively or additionally include other control elements or actions to facilitate collecting operator data. For example, the selectable option 405 may trigger opening a camera application to capture an image of an error barcode printed by the printer in association with the printer status. The prompt 400 may additionally or alternatively include options to pop-up a window for typing input and/or to open a file explorer for browsing/attaching a file to the printer status. In response to receiving input that satisfies the metadata conditions for a particular printer event status, the visual timeline 230 removes display of the visual indicator 350. Further illustrative details of the printer terminal device 110, GUI 210, and visual timeline 230 are described below.

Figure 5:
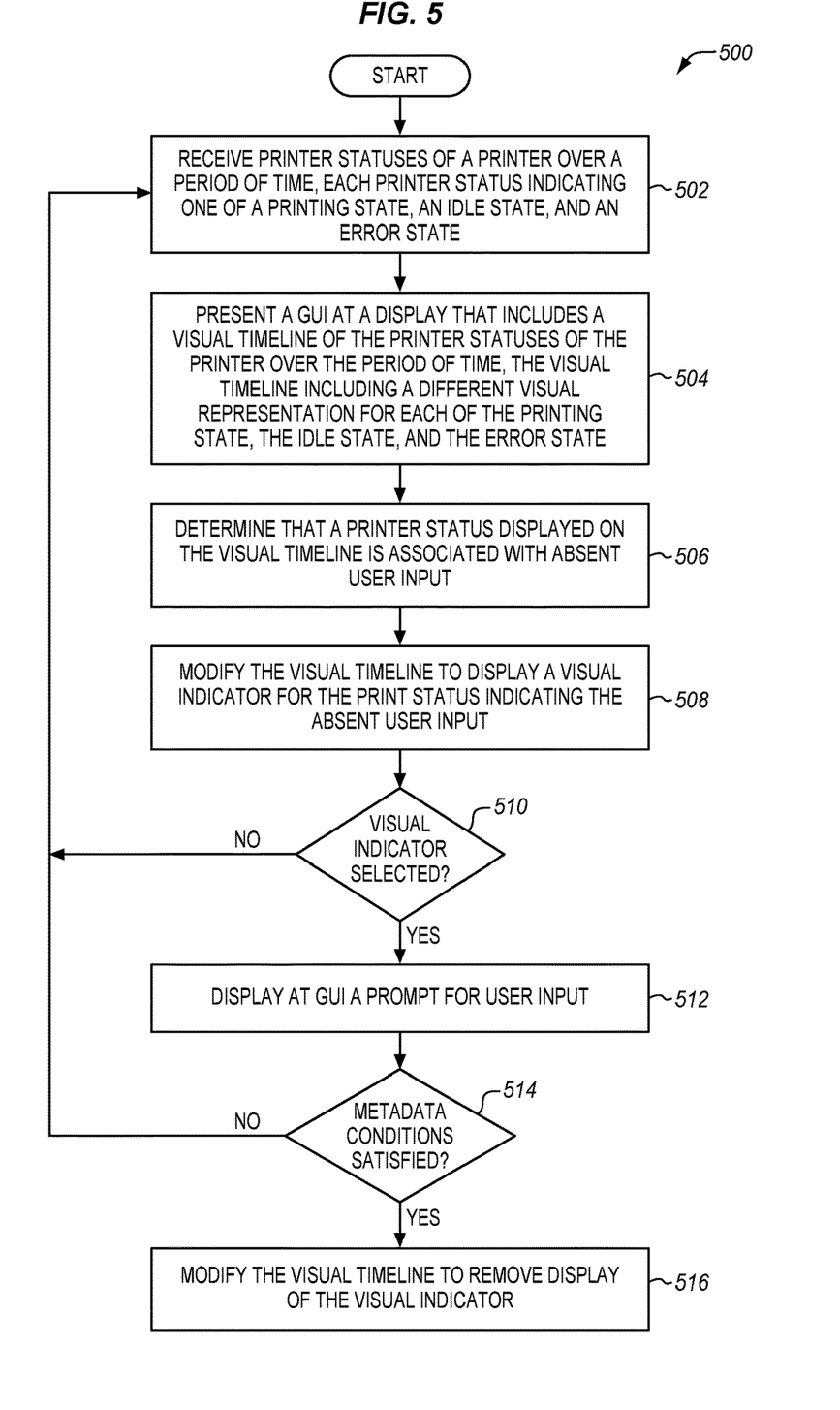
FIG. 5 is a flowchart illustrating a method for collecting data for a printing system in an illustrative embodiment.

FIG. 5 is a flowchart illustrating a method for collecting data for a printing system in an illustrative embodiment. The steps of the method 500 are described with reference to the print system 100 of FIG. 1, but those skilled in the art will appreciate that the method 500 may be performed in other systems. The steps of the flowcharts described herein are not all inclusive, may include other steps not shown, and may be performed in an alternative order.

In step 502, the printer terminal device 110 receives printer statuses of the printer over a period of time, each printer status indicating one of a printing state, an idle state, and an error state. In step 504, the printer terminal device 110 presents the GUI 210 at the display 118 that includes a visual timeline 230 of the printer statuses 331-338 of the printer over the period of time, the visual timeline 230 including a different visual representation for each of the printing state, the idle state, and the error state.

In step 506, the printer terminal device 110 determines that a printer status (e.g., printer status 335) displayed on the visual timeline 230 is associated with absent user input. For example, the printer terminal device 110 may flag printer idle statuses as associated with absent user input if the idle period lasted longer than a predetermined number of minutes. As another example, the printer terminal device 110 may flag error statuses as associated with absent user input if the error belongs to a predetermined category of print errors. The printer terminal device 110 may determine the metadata conditions for a printer status based on various combinations of factors including, but not limited to, print job type (e.g., simplex/duplex, business cards, calendars, statements, etc.), print job size (e.g., length, file size, number of sheets, etc.), print job name, print job customer, printer type/identifier, and/or operator identifier.

In step 508, the printer terminal device 110 modifies the visual timeline 230 to display a visual indicator 350 for the printer status indicating the absent user input. In step 510, the printer terminal device 110 determines whether the visual indicator 350 has been selected. If not, the method 500 returns and repeats steps 502-510 as the visual timeline 230 continues to reflect updates to the printer status history over time. Otherwise, if the visual indicator 350 is selected, the method 500 proceeds to step 512 where the printer terminal device 110 displays at the GUI 210 a prompt (e.g., prompt 400) for user input.

In step 514, the printer terminal device 110 determines whether the metadata conditions for the printer status are satisfied by the user input. If not, the method 500 returns and repeats steps 502-510 as the visual timeline 230 continues to reflect updates to the printer status history over time. Otherwise, if the metadata conditions for the printer status are satisfied by the user input, the method 500 proceeds to step 516 where the printer terminal device 110 modifies the visual timeline 230 to remove display of the visual indicator 350. Thus, in using the method 500, the print operator is visually prompted to enter printer status metadata throughout the normal course of their print management duties instead of at the end of the day.

Figure 6:
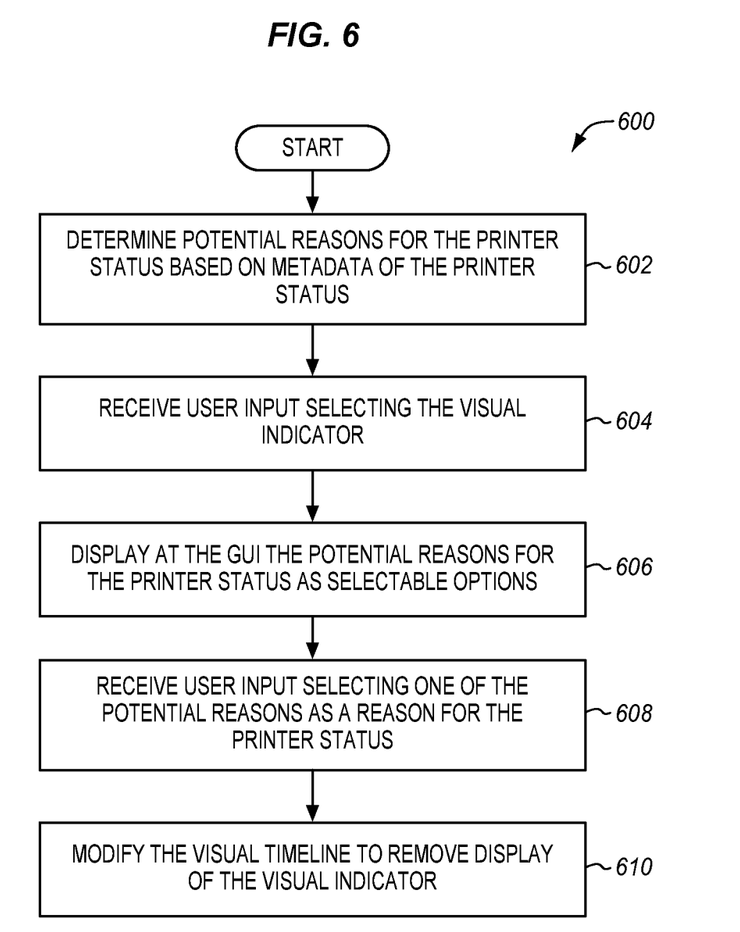
FIG. 6 is a flowchart illustrating a method for collecting data for a printing system in another illustrative embodiment.

FIG. 6 is a flowchart illustrating a method 600 for collecting data for a printing system in another illustrative embodiment. The steps of the method 600 are described with reference to the print system 100 of FIG. 1, but those skilled in the art will appreciate that the method 600 may be performed in other systems. The steps of the flowcharts described herein are not all inclusive, may include other steps not shown, and may be performed in an alternative order.

In step 602, the printer terminal device 110 determines potential reasons for one or more printer statuses 331-338 based on metadata associated with each printer status. For example, the printer terminal device 110, being in communication with the printer, is configured to track/retrieve metadata of print jobs processing/printing with the printer.

As idling/error events occur with a print job, the printer terminal device 110 may correlate attributes of the job with the event to determine potential reasons for the event. For example, the printer terminal device 110 may reference metadata of similar, previous print jobs (e.g., same type of print job, similar time of day, etc.) to determine and/or rank the potential reasons for the printer idling.

In step 604, the printer terminal device 110 receives user input selecting the visual indicator 350. In response thereto, in step 606, the printer terminal device 110 displays at the GUI 210 the potential reasons for the printer status as selectable options. The printer terminal device 110 thus automatically generates/displays reasons the print operator is most/more likely to use to explain the printer event, thereby obtaining accurate operator input while simplifying the operator's manual effort in entering the input.

The printer terminal device 110 may display the potential reasons according to their determined rank, indicating which reasons are most or more likely to occur given the circumstances surrounding the printer event. The printer terminal device 110 may display potential reasons in order of rank (e.g., most likely potential reason at topmost and/or leftmost position of prompt/window). Alternatively or additionally, potential reasons with higher ranks may be displayed in a highlighted or visually prominent manner for convenience to the print operator.

In step 608, the printer terminal device 110 receives user input selecting one of the potential reasons as a reason for the printer status. In response thereto, in step 610, the printer terminal device 110 modifies the visual timeline 230 to remove display of the visual indicator 350. The method 600 thus improves data accuracy of printer events by seamlessly displaying visual cues that encourage the print operator to tag specific events with additional data that may be collected over time to improve print operations.

Figure 7:
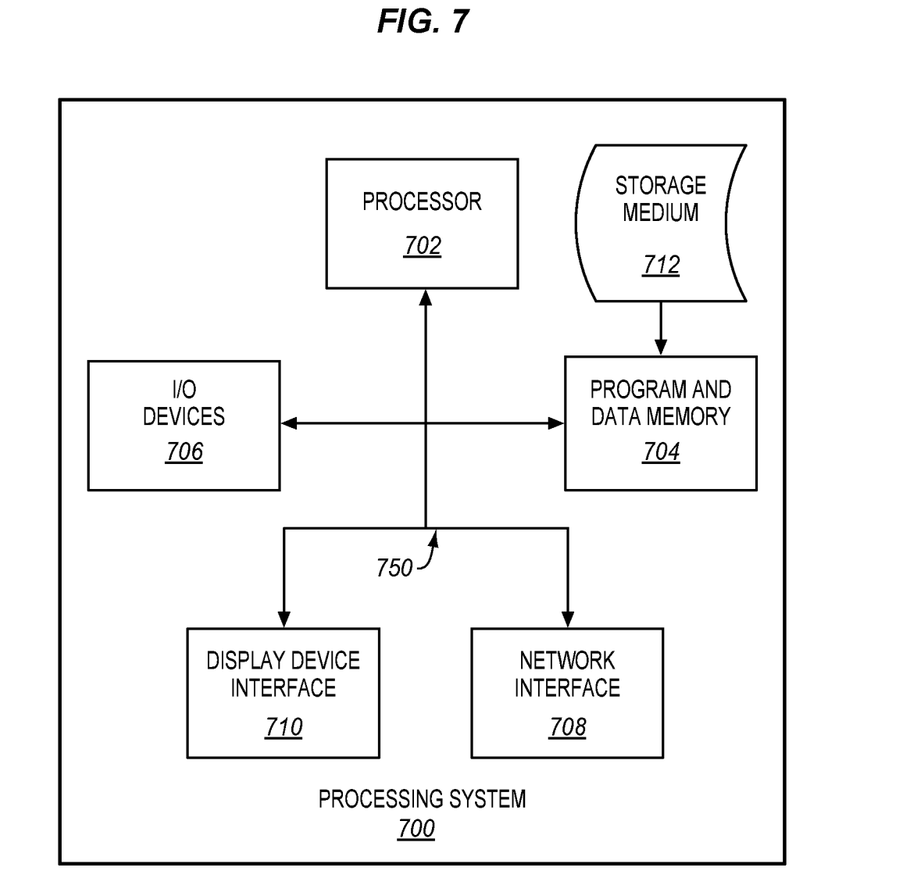
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
   a printer terminal device in communication with a printer and configured to receive printer statuses of the printer over a period of time, each printer status indicating one of a printing state, an idle state, and an error state,
   the printer terminal device configured to present a Graphical User Interface (GUI) at a display that includes a visual timeline of the printer statuses of the printer over the period of time, the visual timeline including a different visual representation for each of the printing state, the idle state, and the error state, and
   the printer terminal device configured to determine that a printer status displayed on the visual timeline is associated with absent user input, and to modify the visual timeline to display a visual indicator that accentuates an appearance of the printer status on the visual timeline to visually indicate the absent user input of the printer status.

2. The system of claim 1 wherein the printer terminal device is further configured to:
   in response to receiving user input selecting the visual indicator, display at the GUI a prompt to enter user text for the printer status; and
   in response to receiving the user text for the printer status, modify the visual timeline to remove display of the visual indicator.

3. The system of claim 1 wherein the printer terminal device is further configured to:
   determine potential reasons for the printer status based on metadata of the printer status;
   in response to receiving user input selecting the visual indicator, display at the GUI the potential reasons for the printer status as selectable options; and
   in response to receiving user input selecting one of the potential reasons as a reason for the printer status, modify the visual timeline to remove display of the visual indicator.

4. The system of claim 1 wherein the printer terminal device is further configured to:
   in response to receiving user input selecting the visual indicator, display at the GUI a prompt to capture an image of an error barcode printed by the printer in association with the printer status; and in response to receiving the image of the error barcode printed by the printer in association with the printer status, modify the visual timeline to remove display of the visual indicator.

5. The system of claim 1 wherein:
the visual indicator comprises a visual overlay on the printer status in the visual timeline.

6. The system of claim 5 wherein:
the visual overlay comprises hash marks.

7. The system of claim 1 wherein:
the different visual representation for each of the printing state, the idle state, and the error state includes a different color.

8. A method comprising:
receiving printer statuses of a printer over a period of time, each printer status indicating one of a printing state, an idle state, and an error state;
presenting a Graphical User Interface (GUI) at a display that includes a visual timeline of the printer statuses of the printer over the period of time, the visual timeline including a different visual representation for each of the printing state, the idle state, and the error state;
determining that a printer status displayed on the visual timeline is associated with absent user input; and
modifying the visual timeline to display a visual indicator that accentuates an appearance of the printer status on the visual timeline to visually indicate the absent user input of the printer status.

9. The method of claim 8 further comprising:
in response to receiving user input selecting the visual indicator, displaying at the GUI a prompt to enter user text for the printer status; and
in response to receiving the user text for the printer status, modifying the visual timeline to remove display of the visual indicator.

10. The method of claim 8 further comprising:
determining potential reasons for the printer status based on metadata of the printer status;
in response to receiving user input selecting the visual indicator, displaying at the GUI the potential reasons for the printer status as selectable options; and
in response to receiving user input selecting one of the potential reasons as a reason for the printer status, modifying the visual timeline to remove display of the visual indicator.

11. The method of claim 8 wherein:
the visual indicator comprises a visual overlay on the printer status in the visual timeline.

12. The method of claim 11 wherein:
the visual overlay comprises hash marks.

13. The method of claim 8 wherein:
the different visual representation for each of the printing state, the idle state, and the error state includes a different color.

14. A non-transitory computer readable medium embodying programmed instructions which, when executed by a processor, are operable for performing a method comprising:
receiving printer statuses of a printer over a period of time, each printer status indicating one of a printing state, an idle state, and an error state;
presenting a Graphical User Interface (GUI) at a display that includes a visual timeline of the printer statuses of the printer over the period of time, the visual timeline including a different visual representation for each of the printing state, the idle state, and the error state;
determining that a printer status displayed on the visual timeline is associated with absent user input; and
modifying the visual timeline to display a visual indicator that accentuates an appearance of the printer status on the visual timeline to visually indicate the absent user input of the printer status.

15. The non-transitory computer readable medium of claim 14 wherein the method further comprises:
in response to receiving user input selecting the visual indicator, displaying at the GUI a prompt to enter user text for the printer status; and
in response to receiving the user text for the printer status, modifying the visual timeline to remove display of the visual indicator.

16. The non-transitory computer readable medium of claim 14 wherein the method further comprises:
determining potential reasons for the printer status based on metadata of the printer status;
in response to receiving user input selecting the visual indicator, displaying at the GUI the potential reasons for the printer status as selectable options; and
in response to receiving user input selecting one of the potential reasons as a reason for the printer status, modifying the visual timeline to remove display of the visual indicator.

17. The non-transitory computer readable medium of claim 14 wherein the method further comprises:
in response to receiving user input selecting the visual indicator, displaying at the GUI a prompt to capture an image of an error barcode printed by the printer in association with the printer status; and
in response to receiving the image of the error barcode printed by the printer in association with the printer status, modifying the visual timeline to remove display of the visual indicator.

18. The non-transitory computer readable medium of claim 14 wherein:
the visual indicator comprises a visual overlay on the printer status in the visual timeline.

19. The non-transitory computer readable medium of claim 18 wherein:
the visual overlay comprises hash marks.

20. The non-transitory computer readable medium of claim 14 wherein:
the different visual representation for each of the printing state, the idle state, and the error state includes a different color.

* * * * *